United States Patent [19]

Fischer et al.

[11] Patent Number: 5,018,094
[45] Date of Patent: May 21, 1991

[54] DUAL INCREMENTER

[75] Inventors: Horst Fischer, Haar; Wolfgang Rohsaint; Mohammed Hmimid, both of Munich, all of Fed. Rep. of Germany

[73] Assignee: Siemens Aktiengesellschaft, Munich, Fed. Rep. of Germany

[21] Appl. No.: 379,269

[22] Filed: Jul. 13, 1989

[30] Foreign Application Priority Data

Aug. 30, 1988 [DE] Fed. Rep. of Germany ....... 3829413

[51] Int. Cl.$^5$ .............................................. G06F 7/50
[52] U.S. Cl. .................................................. 364/770
[58] Field of Search .............................. 364/770, 768

[56] References Cited

U.S. PATENT DOCUMENTS 4,685,078 8/1987 Torres ................................. 364/770
4,709,226 11/1987 Christopher ................. 340/347 DD

FOREIGN PATENT DOCUMENTS 0177261 4/1986 European Pat. Off. .

OTHER PUBLICATIONS

"Parallel-Array Incrementing Network", IBM Technical Disclosure Bulletin, vol. 27, No. 11, Apr. 1985, pp. 6450-6453.
"FET DRAM Look-Ahead Address Incrementer", IBM Technical Disclosure Bulletin, vol. 28, No. 1, Jun. 1985, pp. 71 α 73.
"MOSFET Look-Ahead Bit Incrementer/Decrementer", IBM Technical Disclosure Bulletin, vol. 28, No. 2, Jul. 1985, pp. 741-742.

Primary Examiner—Dale M. Shaw
Assistant Examiner—Long T. Nguyen
Attorney, Agent, or Firm—Hill, Van Santen, Steadman & Simpson

[57] ABSTRACT

An input binary member can be modified by one unit with the assistance of an incrementer, composed of a first circuit CL that generates switch signals (p) from the bit places (d) of the input binary number, these switch signals (p) for the least significant digit (d0) being equal to the value of this digit and, at more significant digits, being generated by AND operation out of the less significant bit of the input binary number. The bit digits of the binary output member (A) are generated with the assistance of an output stage to which the input binary number (D) and the digit signals (P) are supplied. The least significant bit digit of the output binary number is acquired by inversion of the least significant bit place of the input binary number. The more significant bit places of the output binary number are acquired from the allocated binary digits of the input binary number, whereby an arbitrary, an $i^{th}$ bit digit of the output binary number is equal to the $i^{th}$ bit digit of the input binary number when the switch signal of the first circuit (CL) that had been acquired through the bit places 0 . . . i=1 is binary 1. Otherwise, this bit digit (d(i)) of the input binary number is connected through to the output in inverted form. The first circuit can be constructed such that respective subcircuits are provided for generating the switch signals, these sub-circuits comprising an identical plurality of stages, to provide a regular structure that can be easily expanded. The output stage must merely provide multiplexers that, dependent on the switch signals, through-connect the bit places of the input plurality either directly or inverted.

9 Claims, 9 Drawing Sheets

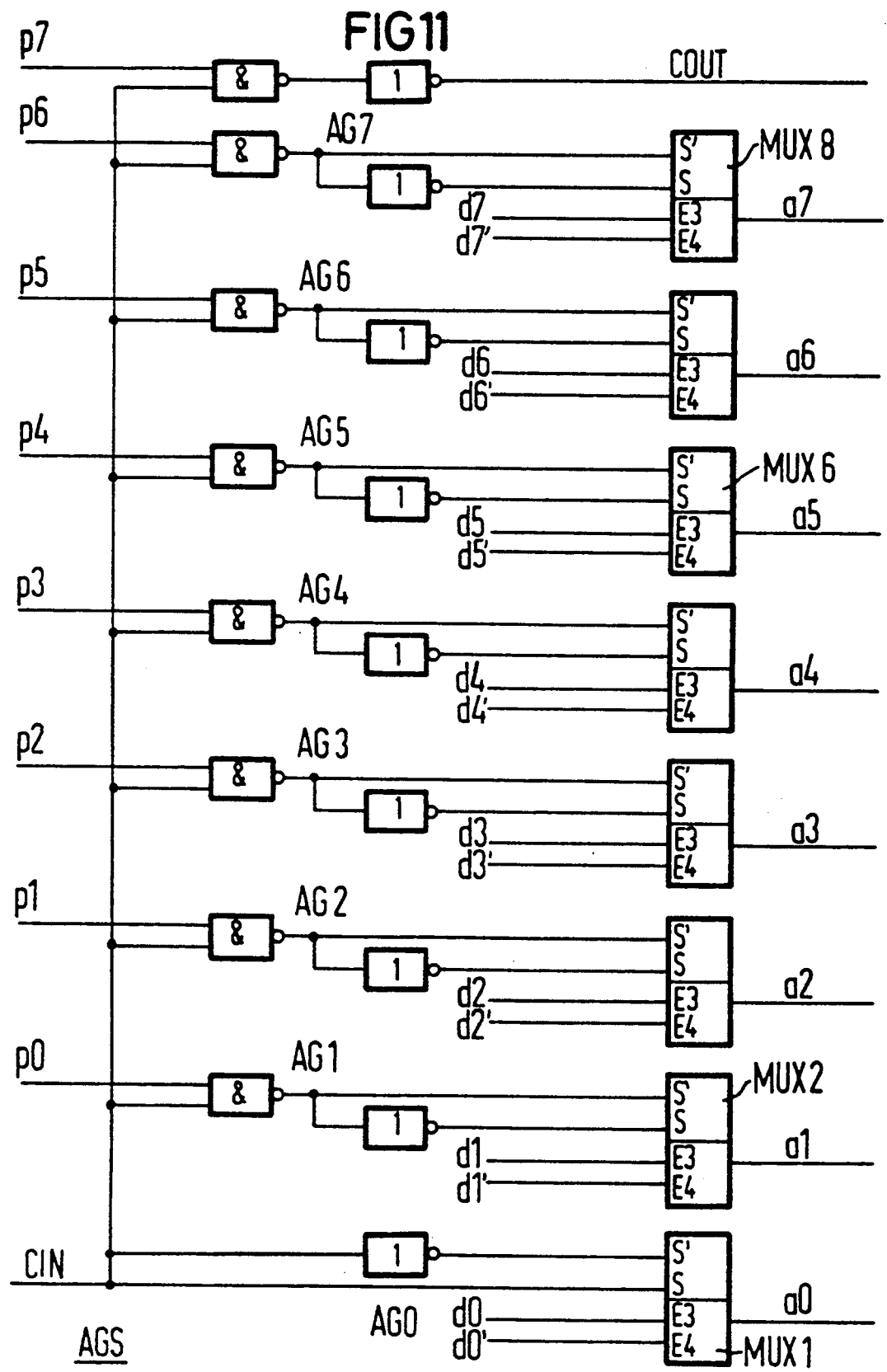

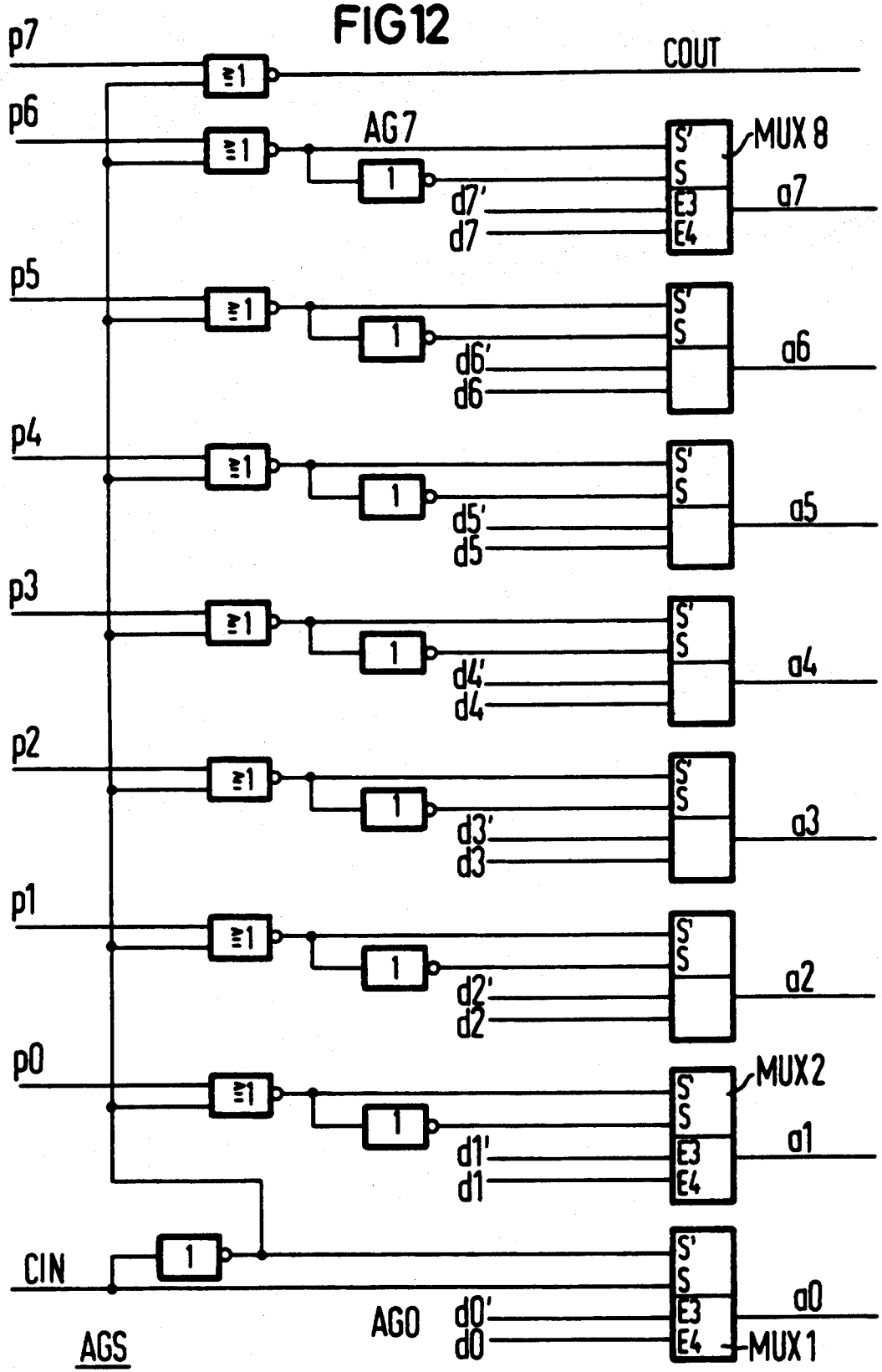

DUAL INCREMENTER

BACKGROUND OF THE INVENTION

The invention is directed to an incrementer for modifying an n-digit input binary number by one unit into an n-digit output binary number.

It is known to construct incrementers with carry-look-ahead technique, which use a two-stage logic (NAND-OR). This technique is particularly utilized for word widths up to four bits. Given greater word widths, gates having too many inputs would be required. The circuit is irregular since a different transfer function must be implemented for every bit of the input binary number (see IBM Technical Disclosure Bulletin, June 1985, pages 741 and 742 "MOSFET Look-Ahead Bit Incrementer/Decrementer").

SUMMARY OF THE INVENTION

The object underlying the invention specifies an incrementer with arbitrary word widths that supplies the result very quickly, and is very regularly constructed. This object is achieved with an incrementer in accordance with the present invention.

The incrementer is composed of two circuits. A first circuit operates the bit places of the input binary number with one another such in a carry-look-ahead structure that a switch signal is formed for every bit place. This first circuit comprises a regular structure, which generates the switch signals very rapidly. The structure of the circuit can be very simply adapted to larger or smaller widths of the binary number. The binary places of the output binary number are then generated with the assistance of an output stage. The bit places of the input binary number are applied to the output stage, as are the switch signals from the first circuit. The output stage always outputs the inverted bit place of the input binary number for the least significant bit place of the output binary number. For the more significant bit places of the output binary number, the output stage forwards the allocated bit place of the input binary number in inverted form when the switch signal is binary 1; otherwise, it forwards the bit place in non-inverted form.

This realization enables the first circuit to provide sub-circuits for every bit place. The expansion of the incrementer then merely requires that further sub-circuits be arranged adjacent to the existing sub-circuits.

BRIEF DESCRIPTION OF THE DRAWINGS

The invention shall be set forth in greater detail with reference to exemplary embodiments shown in the figures. Shown are:

FIG. 11 is a first embodiment of the output stage;

FIG. 12 is a second embodiment of the input stage;

DESCRIPTION OF THE PREFERRED EMBODIMENTS

Figure 1:
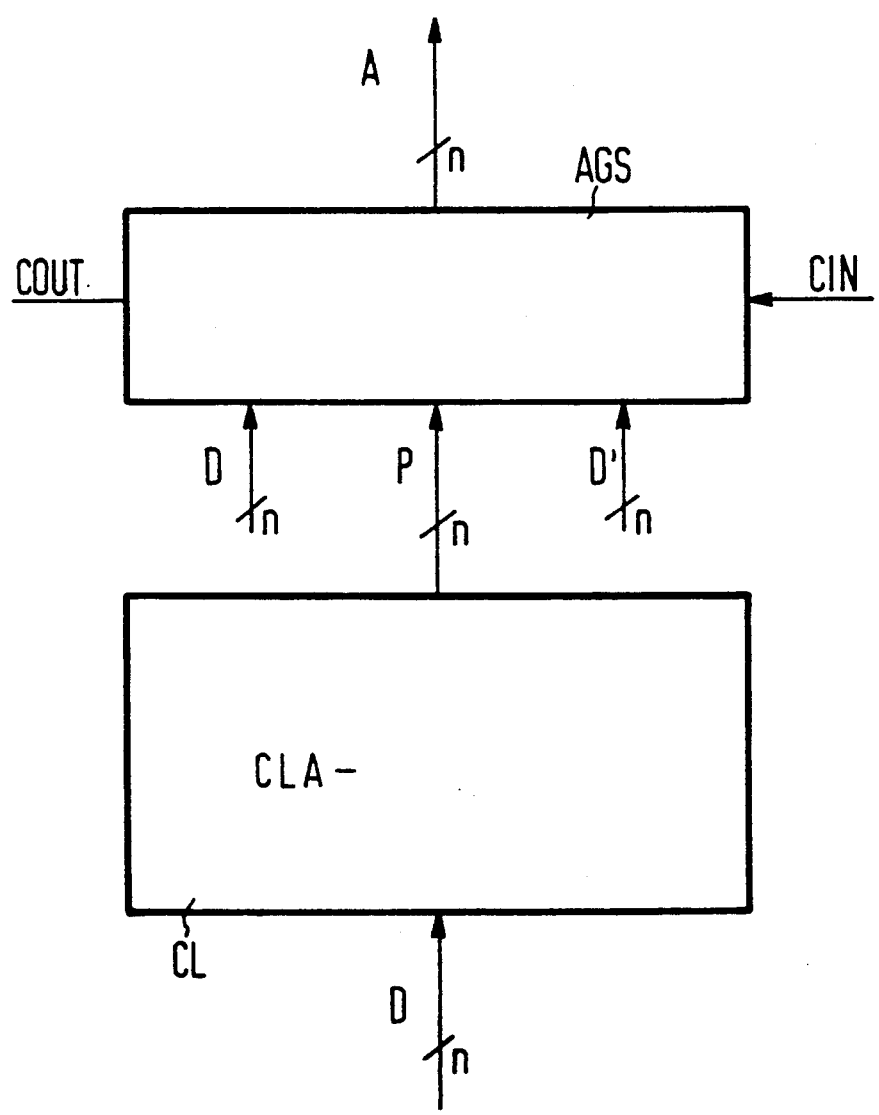
FIG. 1 is a block circuit diagram of the incrementer.

The incrementer is subdivided into a first circuit CL having carry-look-ahead structure and into an output stage AGS (see FIG. 1). The input binary number D that is n-bits wide is supplied to the circuit CL. The circuit CL then generates switch signals P that are used for connecting the binary places of the input binary number D through to the output via the output stage AGS as an output binary number A, either directly or inverted. A determination is made with the assistance of the signal CIN whether the input binary number is being incremented or is not being incremented. The signal COUT can be used to determine whether the highest binary location has been modified when it was previously equal to 1.

Figure 2:
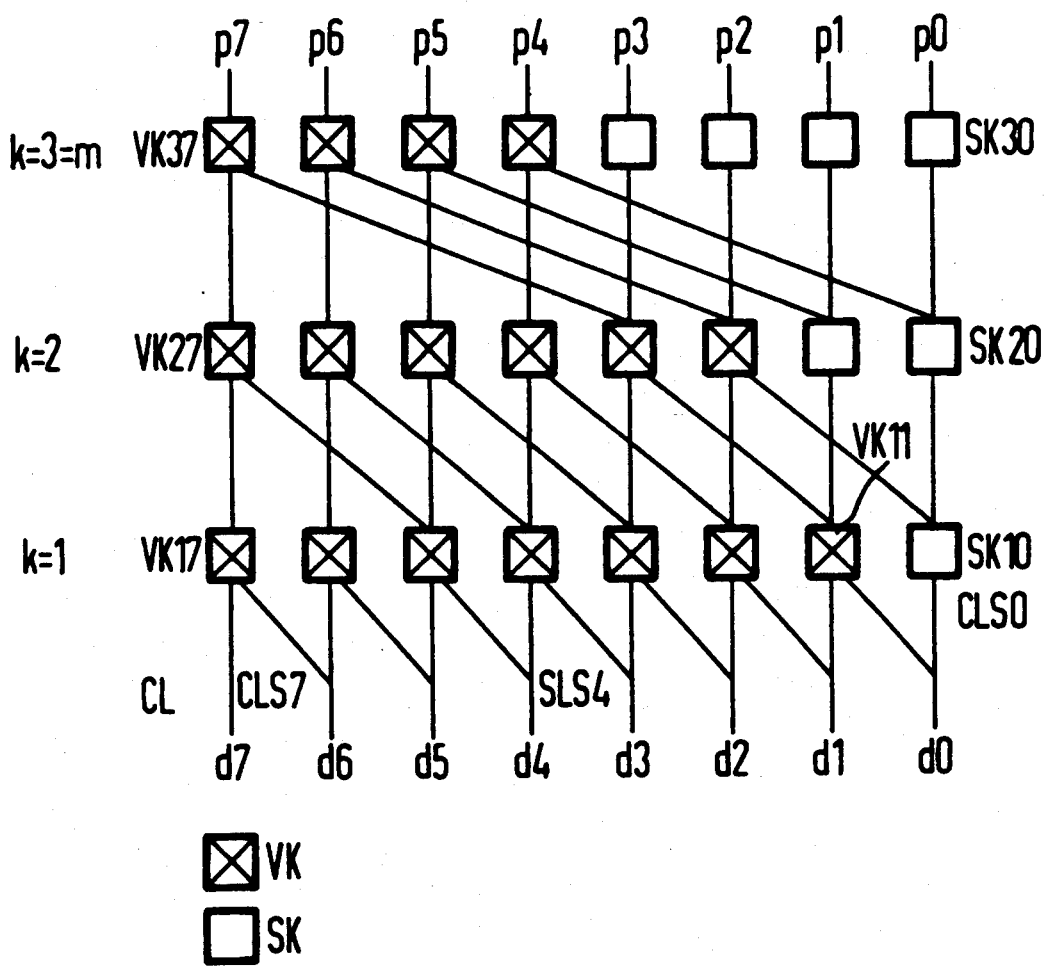
FIG. 2 is a block circuit diagram of a first embodiment of the first circuit.

The incrementer works such that the input binary number D is respectively incremented by one unit. Thus valid are $A = D + 1$ when $CIN = 1$ and $A = D$ when $CIN = 0$ FIG. 2 shows a block circuit diagram of the first circuit CL. The regular structure of the circuit can be seen here. The circuit CL is composed of sub-circuits CLS, of eight sub-circuits CLS0 through CLS7 in the exemplary embodiment given a word width of $n = 8$ bits. Every sub-circuit CLS generates a switch signal p for one bit place d of the input binary number D. Shift circuits SK or logic circuits VK are provided for this purpose in the sub-circuits CLS.

The operation of the bit places of the input binary number D for generating the switch signals p ensues in the following way:

The least significant bit place d0 is employed unmodified as switch signal p0. For reasons of regularity, the sub-circuit CLS0 employed for this purpose provides shift circuits SK that correspond in number to the plurality of logic nodes VK that must be provided for the sub-circuit CL for the most significant bit place of the input binary number.

The switch signal p1 is developed from the bit place d1 and from the bit place d0 of the input binary number. A logic circuit VK11 is employed for this purpose, this outputting a switch signal $p1 = 1$ when the bit places d0 and d1 are binary 1. The switch signal pg for the most significant bit place of the input binary number d7 is binary 1 when the less significant bit places of the input binary numbers d0 through d6 are all binary 1. The analogous case applies for the switch signals p1 through p6.

In order to obtain a regular structure and, thus, logic circuits VK that are always identically structured, the operation of the individual bit places of the input binary number at more significant bit places is distributed onto a plurality of logic circuits VK that, in accord with FIG. 2, are connected to the outputs of the logic circuits that are arranged in sub-circuits CLS for less significant bit places. Sub-circuits that contain a plurality of stages m thus arise (m rounded up to $\log_2 n$).

Figure 14:
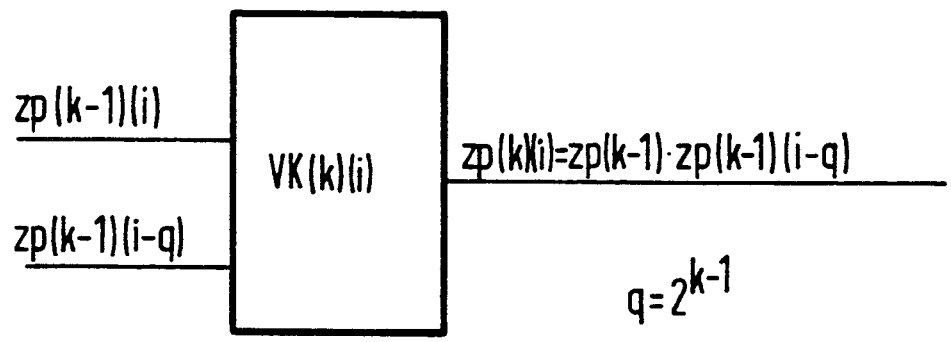
FIG. 14 is the allocation of input signals and output signals to a logic circuit that is used in FIG. 7.

The logic circuits VK of the first stage $k = 1$ always operate the allocated bit place d(i) and the bit place d(i−1), that is, the next least significant. The logic circuits VK of higher stages operate signals as shown in FIG. 14. This shows a logic circuit VK of the $k^{th}$ stage, whereby k=2 ... kmax, kmax rounded up to $\log_2 i$. The input signals of the logic circuits VK are referenced zp, as are the output signals. A logic circuit VK is then supplied with an output signal zp (k−1) (i) from a preceding logic circuit of the same sub-circuit CLS(i) and with an output signal of a preceding logic stage VK of the sub-circuit CLS(i−q), namely zp (k−1) (i−q), $q=2^{k-1}$. This logic stage VK outputs the signal zp(ki) =zp(k−1)(i) * zp(k−1) (i−q) as an output signal. This output signal is the switch signal p(i) when the logic circuit VK is the logic circuit of the highest stage in this sub-circuit CLS.

The number of logic circuits VK within a sub-circuit CLS depends on the number of bit places d to be processed. The maximum number of logic circuits in the most significant sub-circuit CLS, for example the sub-circuit CLS7 of FIG. 2, is rounded up to $\log_2 8$ and thus amounts to 3. Instead of the logic circuits, shift circuits SK are provided in the remaining sub-circuits CLS, so that fewer logic circuits are required for generating the switch signals p, in order to obtain the running times and driver powers that are correct for the operation of the logic circuits VK in addition to obtaining a regular structure of the circuit CL.

Figure 3:
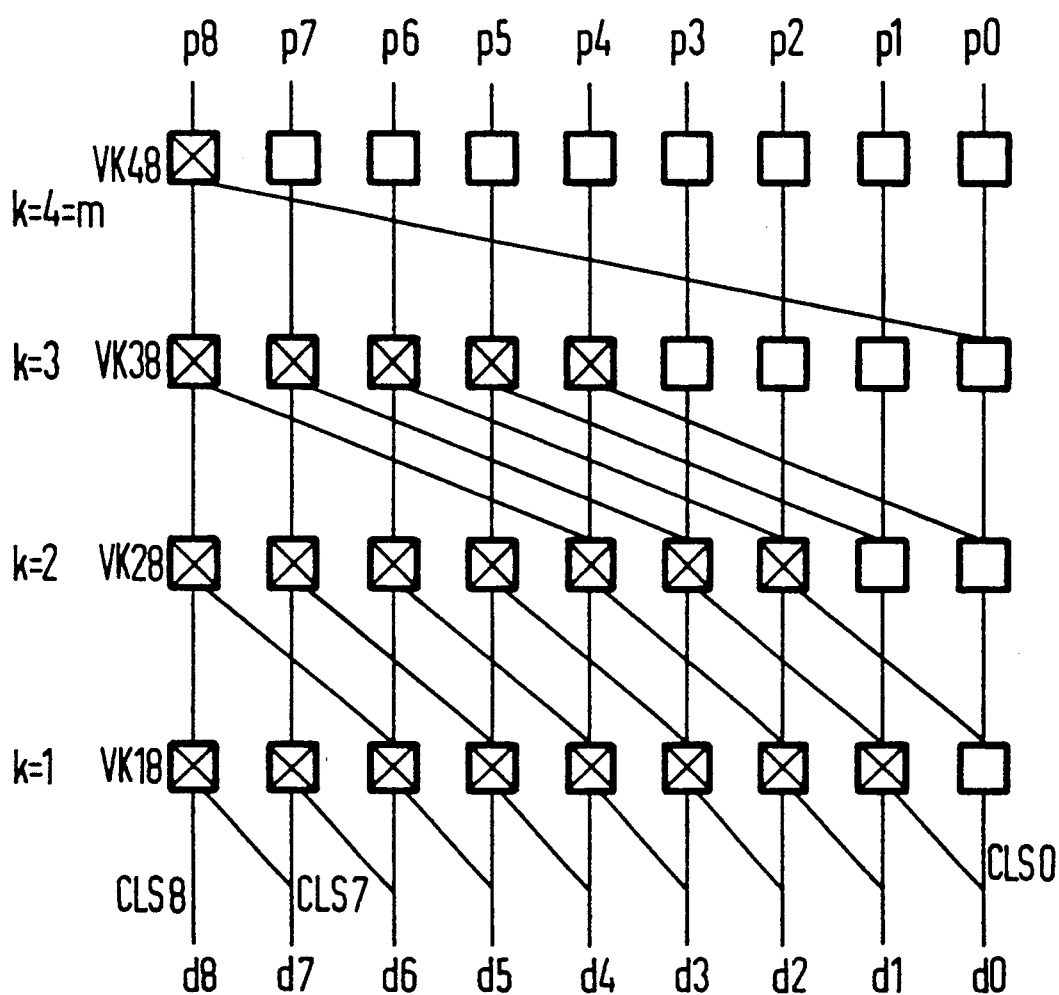
FIG. 3 is a block circuit diagram of an expanded embodiment of the first circuit.

When the word width of the input binary number is incremented by, for example, 1 bit, then the circuit CL must be expanded by merely one sub-circuit CLS that is arranged adjacent to the previous sub-circuit for the most significant bit place of the input binary number. Such an arrangement is shown in FIG. 3. A further sub-circuit CLS8 for the new bit place d8 is now arranged next to the sub-circuit CLS7 for the bit place d7 of the input binary number. This sub-circuit CLS8 then comprises 4 logic circuits since rounded-up $\log_2 9=4$. The connections of the inputs of the logic circuits of the sub-circuit CLS8 can be taken from FIG. 3 and is to be undertaken in accord with the explanation provided with respect to FIG. 2. Shift circuits SK are now provided at the output at the other sub-circuits CLS0 through CLS7, in accord with the logic circuit VK48 at the sub-circuit CLS8.

Figure 4:
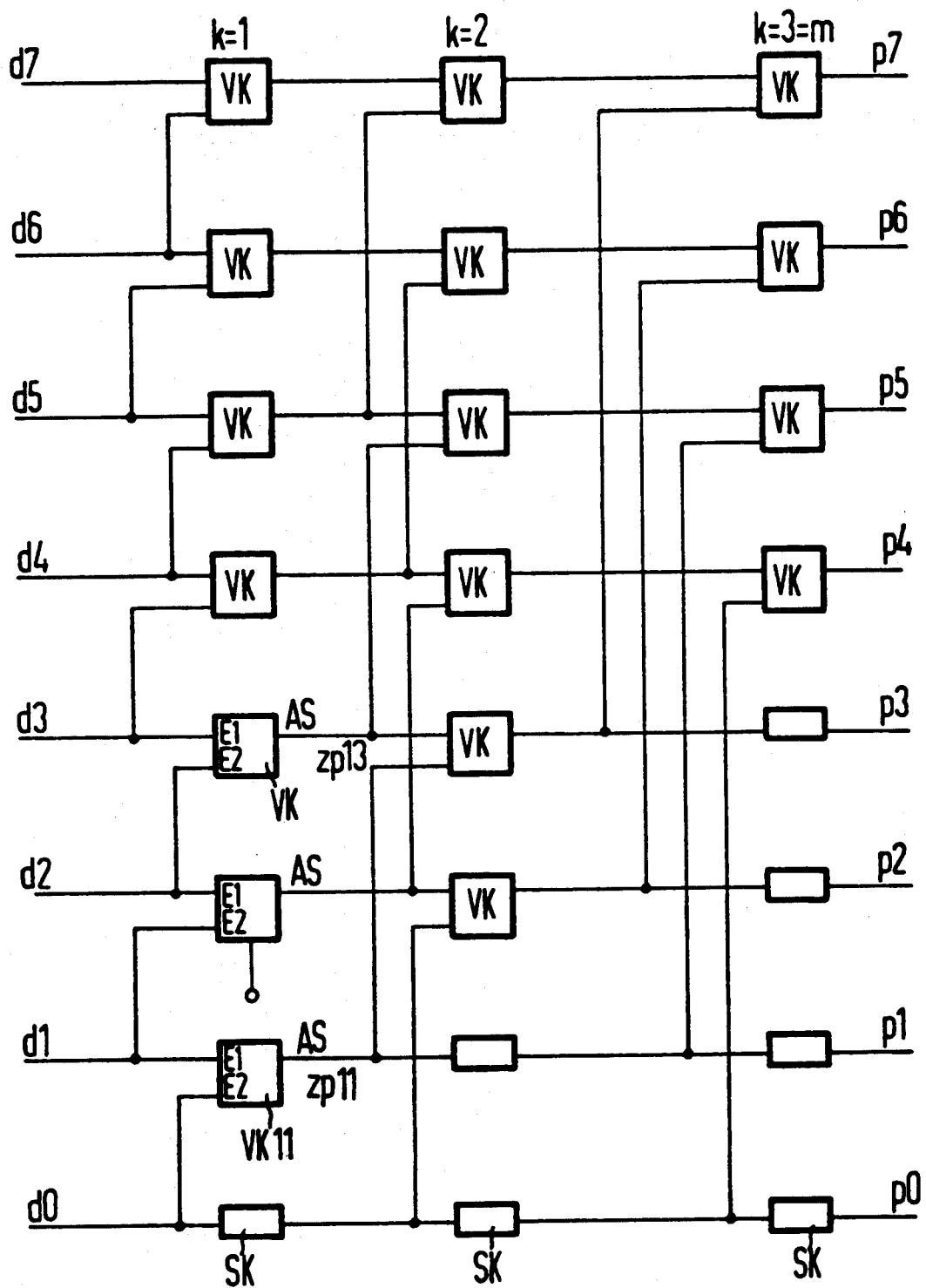
FIG. 4 is the realization of the block circuit diagram of FIG. 2.

The realization of the circuit of FIG. 2 can be taken from FIG. 4. The logic circuits VK comprise two inputs E1 and E2 and one output AS. The logic circuit VK forms an output signal zp at the output AS by AND operation of the signals at the inputs E1 and E2. For example, zp11=d1 * d0 is valid for the logic circuit VK11. The respective output signal zp can be correspondingly calculated for the remaining logic circuits.

Figure 6:
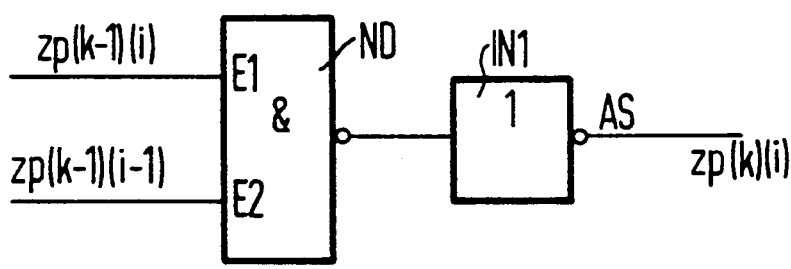

According to FIG. 6, the logic circuits VK are thus composed of AND circuits, of an NAND circuit ND and of an invertor IN1. The logic for stage 2 is shown as an example.

Figure 5:
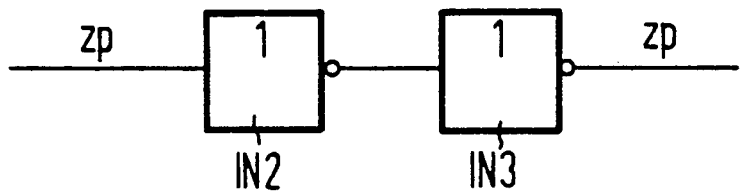
FIGS. 5 and 6 are circuits that are employed in the realization of FIG. 4.

In accord with FIG. 5, invertor circuits IN2 and IN3 are employed for the shift circuits SK. The connections of the individual logic circuits VK and shift circuits SK can be derived from FIG. 2.

Figure 8:
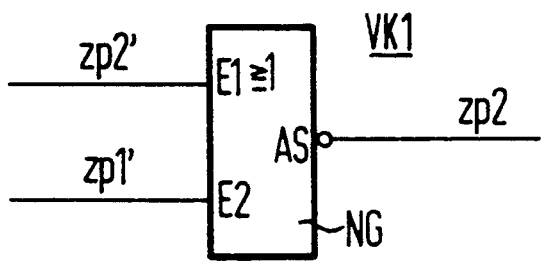
FIGS. 8-10 are circuits that are employed in FIG. 7.
Figure 9:
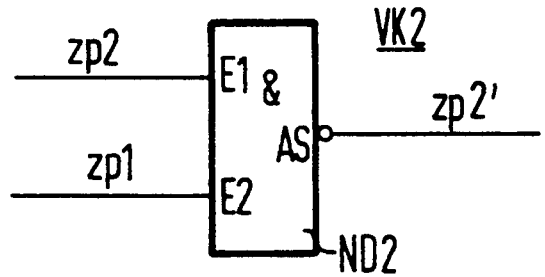
Figure 10:
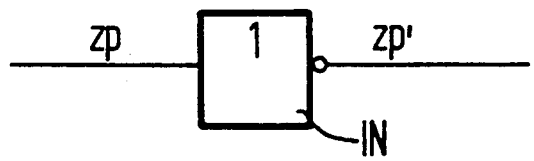
Figure 7:
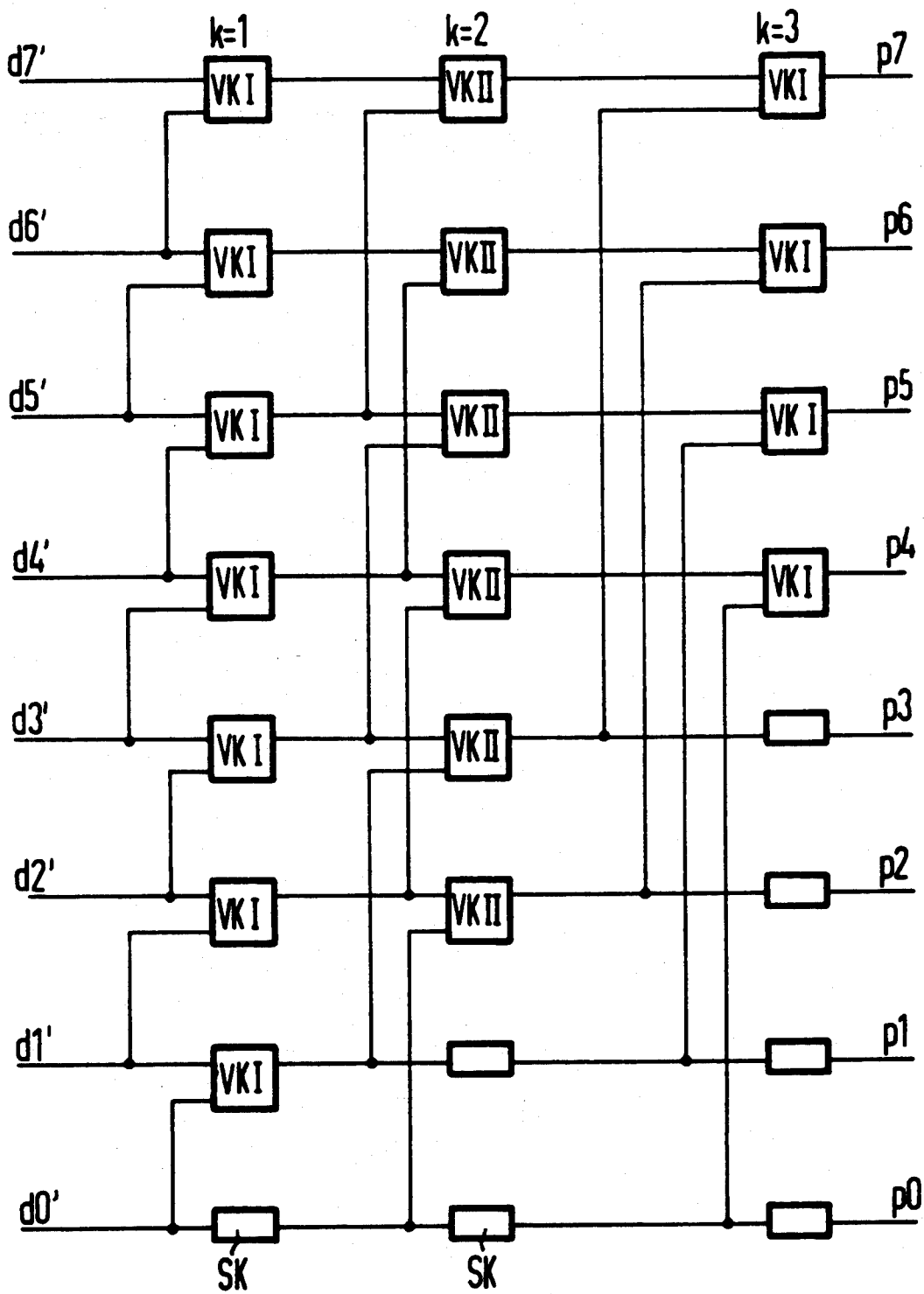
FIG. 7 is a second embodiment of the block circuit diagram of FIG. 2.

FIG. 7 shows a second realization of FIG. 2 that is advantageous for MOS applications. The difference from FIG. 4 is that negated signals are forwarded from stage to stage. One invertor per stage is thus saved. The negated bit places of the input binary number are input signals here, i.e., d(i)'. However, two different logic circuits are required, namely VKI and VKII wherein VKII=VKI' inverted. These are employed in alternation from stage to stage. According to FIG. 8, the logic circuit VKI is now composed of only one NOR gate NG, and the logic circuit VKII (VK2 in FIG. 9) is composed of one NAND gate ND2. The shift circuit is executed in accord with FIG. 10. It is composed merely of an invertor IN.

An embodiment of the output stage AGS is shown in FIG. 11. For every bit place of the output binary number, this provides an output circuit AGO-AG(n−1) each having a multiplexer MUX to whose switchable inputs E3 and E4 the allocated binary place of the input binary number is supplied non-inverted and inverted. Either d or d' is connected through to the output ai with the assistance of control signals that are applied to the control inputs S and S' of the multiplexer MUX.

The control signal for the multiplexer MUX1 for the least significant bit place of the output binary number is acquired from the switch-over signal CIN that is applied such to the control inputs of the multiplexer MUX1 that the bit place d0 of the input binary number adjacent at the multiplexer MUX1 is always connected through inverted form as bit place a0. In accord therewith, the switch-over signal CIN is conducted to the control input S' via an inverter and is conducted to the control input S of the multiplexer MUX1 non-inverted.

The second bit place a1 of the output binary number is acquired with the assistance of the switch signal p0. Given the presence of the switch-over signal CIN and of the switch signal p0, d1' is through-connected via the multiplexer MUX2 as output value a1 when the switch signal p0 is binary 1; otherwise d1. The analogous case applies to the multiplexers MUX allocated to the other bit places of the output binary number. This means that one bit place d(i), given i greater than 0, is only through-connected inverted as bit place a(i) of the output binary number A when p(i)=1. However, p(i) is only binary 1 when the bit places d0 through d(i) of the input binary number are all binary 1. This is valid in the exemplary embodiment given the condition that CIN=1.

Another switch-over signal COUT for a next stage can be acquired with the assistance of the output stage. The switch signal p7 and the switch-over signal CIN can be utilized for that purpose.

The output stage of FIG. 11 is suitable for a first circuit of FIG. 4 but is also suitable for a circuit of FIG. 7 having an uneven plurality of stages. FIG. 12 shows a further embodiment of the output stage that is suitable for a first circuit of FIG. 7 having an even plurality of stages. It can be easily derived from FIG. 12 that this output stage likewise generates the bit places a of the output binary number from the bit places d of the input binary number upon employment of the switch signals p based on the recited principle.

Figure 13:
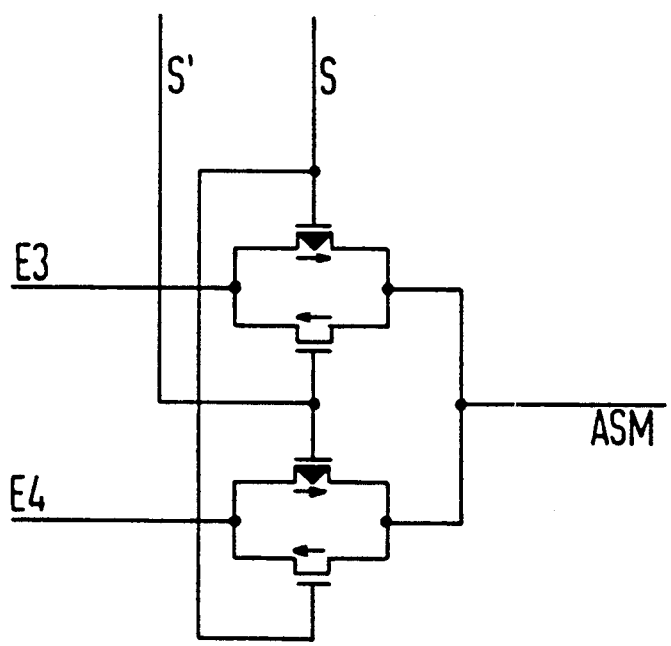
FIG. 13 is a circuit that is employed in the output stages.

The multiplexers that are used in FIG. 11 and in FIG. 12 can be constructed in CMOS technology in accord with FIG. 13. Dependent on the control signal s, either the input signal at the input E3 or the input signal at the input E4 is connected through to the output ASM. The function can be easily derived from FIG. 13.

It will be understood that variations and modifications may be effected without departing from the spirit and scope of the novel concepts of the present invention.

What is claimed is:

1. A dual incrementer for modifying an n-digit input binary number (D) by one unit into an n-digit output binary number (A), said incrementer comprising, in combination;

a first circuit (CL), having n inputs to which the binary digits of the input binary number (D) are supplied and having n outputs, and in the case of an input binary number (D) consisting of n ($i=0,1 \ldots n-1$) binary digits ($d(i)$), this first circuit (CL) supplies a switch signal ($p(i)$) at each of n outputs ($i=0,1 \ldots n-1$) from said n outputs, an output stage (AGS), having n inputs for receiving said switch signals and having n inputs for receiving the n binary digits of the input binary number (D) and n corresponding outputs for supplying the n binary digits of the output binary number (A), and as for the binary digit $i=0$, an inverted binary value of the received binary digit ($d(o)$) is applied at the output of said output stage for this binary digit, and as for each of the other remaining outputs i of said output stage ($i=1, \ldots n-1$), the binary value of the received binary digits ($d(i)$) is applied at the corresponding output, where a switch signal ($p(i-1)$) is received from the first circuit (CL), which switch signal corresponds to the binary digit $i-1$.

2. The dual incrementer according to claim 1, characterized in that said first circuit (CL) is composed of n sub-circuits (CLS), each corresponding to one of the binary digits of the input binary number (D), each said sub-circuit i (CL(i)) being operative to output a switch signal (p(i)) only when all of the digits r ($r=0,1 \ldots i$) of the input binary number (D) assume a one binary value ("1").

3. The dual incrementer according to claim 2, characterized in that said output stage (AGS) comprises n output circuits (AGO, ... AG(n−1)), each corresponding to one binary digit of the input binary number (D) and output binary number (A), and as for the digit (d(i))-(i=0), an inverted binary value of the received binary digit (d(O)) is applied by the corresponding output stage (AGO) at the output for this binary digit, and as for each of the other remaining binary digits (d(i)) ($i=1 \ldots n-1$), the binary value of the received digit (d(i)) is applied at the corresponding output, when from the first circuit (CL) a switch signal (p(i−1) is received, which switch signal corresponds to the binary digit i−1, otherwise the inverted binary value of the received binary digit (d(i)) is applied at the corresponding output.

4. The dual incrementer according to claim 3, characterized in that each sub-circuit (CLS) corresponding to one of the binary digits $i > 0$ is composed of a number, equal to rounded-up $\log_2 i$, of logic circuits (VK) arranged succeeding in subsequent stages k, a first of said logic circuits (VK1(i)) generates an output signal (ZP(1)(i)) by AND operation of the binary digit i (d(i)) and of the binary digit i−1 (d(i−1)), each of the other said logic circuits (VK(k)(i=2, ... rounded-up $\log_2 i$) generates an intermediate signal (ZP(k)(i)) by AND operation of the intermediate signal (ZP(k−1)(i)) from the preceding logic circuit (VK(k−1)(i−q); $q=2^{k-1}$) of the logic circuit (VK(k−1)(i−q); $q=2^{k-}$), which is arranged in the same proceeding stage k−1 but in that sub-circuit (CLS(i−q)), which corresponds to the binary digit i−q, $q=2^{k-1}$.

5. The dual incrementer according to claim 4, characterized in that the sub-circuit (CLS0) corresponding to the binary digit $i=0$ is composed of a shift circuit (SK) which transfers the corresponding binary digit (dO) of the input binary number (D) to the output as the switch signal (pO).

6. The dual incrementer according to claim 5, characterized in that each sub-circuit (CLS) is composed of an identical number of stages $m > 0$, equal to rounded-up $\log_2 n$, and at least one of said stages is formed by a shift circuit (SK) instead of the provided logic circuit for each of those sub-circuits (CLS) requiring a smaller number of logic circuits than m.

7. The dual incrementer according to claim 6, characterized in that the sub-circuits (CLS) are arranged side-by-side as the corresponding binary digit i increases.

8. The dual incrementer according to claim 7, characterized in that a further sub-circuit (CLS) (n) composed of a number of rounded-up $\log_2(n=1)$ logic circuits is arranged next to the latter sub-circuit (CLS(n−1)) in performing an increase of word width of the input binary number (D) by one bit.

9. The dual incrementer according to claim 8, characterized in that when the said increase in word width n results in an increase in m, then a shift circuit (SK) is arranged as the last stage of each of the sub-circuits (CLS)(o)−(CLS)(n−1).

* * * * *